March 31, 1964  D. F. CREGO ETAL  3,127,181
PRESSURE BALANCED SEAL
Filed Oct. 9, 1961
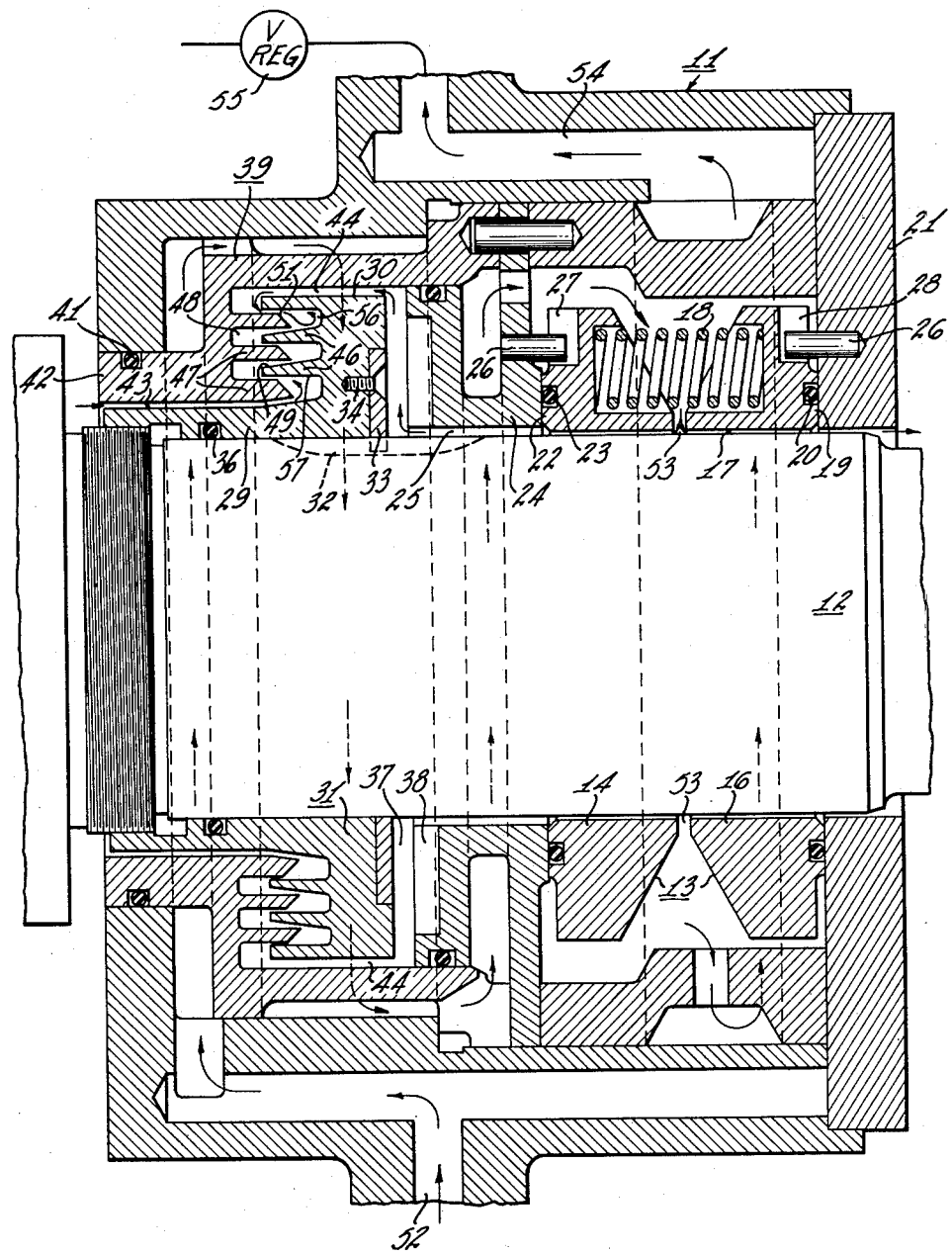
Inventors
Donald F. Crego
Gerald Lesiecki
By John P. Hines
Attorney United States Patent Office 3,127,181
Patented Mar. 31, 1964

3,127,181
PRESSURE BALANCED SEAL
Donald F. Crego, Elm Grove, and Gerald Lesiecki, Greendale, Wis., assignors to Allis-Chalmers Manufacturing Company, Milwaukee, Wis.
Filed Oct. 9, 1961, Ser. No. 143,727
5 Claims. (Cl. 277—3)

This invention pertains to a seal for fluid processing rotating machinery in general and more particularly to a liquid seal wherein the sealing liquid is substantially pressure balanced with the processed fluid thereby minimizing the amount of leakage of the sealing liquid into the environment of the processed fluid.

As the use of rotating machinery has expanded and the temperature and pressures of the processed fluid have increased, the ever present problem of providing a seal between the rotating shaft and stationary housing has become more complex. A particularly difficult situation arises when it is required to seal a caustic or explosive gas from the atmosphere. Since in this type of situation it is necessary to insure a complete sealing of the gas from the atmosphere, liquid seals are quire frequently used.

At the outset, it will be helpful to define the types of seals referred to in the specification. A mechanical seal as herein used refers to a seal wherein there is actual physical contact between the rotating and stationary portions of the seal. A centrifugal seal as used herein refers to a seal wherein a rotating annulus of liquid blocks the escape of processed fluid to atmosphere. A limited leakage seal as herein used refers to a seal wherein a sealing liquid at a pressure greater than the pressure of the processed fluid is admitted to a clearance between the rotating and stationary portions of the seal, which clearance is in communication with the processed fluid. Furthermore, in most cases the specification will refer to a gas as the processed medium, however, it should be understood that a liquid could also be sealed with the only requirement being that the sealing liquid have a greater density than the processed liquid.

There are basically two types of generally accepted liquid seals. One type is the centrifugal seal wherein a rotating portion of the machine acts on the sealing liquid to provide a rotating annulus of sealing liquid which prevents the flow of processed fluid to atmosphere. Since a centrifugal seal is only effective after the machine begins to rotate, it is a general practice to provide a mechanical seal in series with the centrifugal seal which is effective during static conditions and which may become ineffective during dynamic conditions. With the inclusion of a mechanical seal, the inherent drawbacks of wear and adjustment are introduced into the liquid seal which is not originally plagued with these drawbacks. If a centrifugal seal, as it has existed prior to applicants' invention, is employed to block the escape of a caustic or explosive gas to atmosphere, it is quite possible for the gas to become entrained in the sealing liquid particularly at the higher shaft speeds being used today. Entrainment results when pockets or voids are formed in the sealing liquid. These voids are at a pressure lower than the gas pressure and hence the gas becomes entrained with the liquid. Furthermore, since the gas is in intimate contact with the sealing liquid, the liquid can absorb some of the gas and become contaminated. The entrained gas is quite likely to escape to atmosphere. Absorption of the gas into the liquid may so alter the physical properties of the sealing liquid that the centrifugal seal becomes ineffective. Additionally, in many applications it is desirable to utilize the sealing liquid to cool and lubricate different portions of the rotating machine and, therefore, the initial physical properties of the liquid must not be altered. This has not always been possible with a centrifugal seal prior to applicants' invention since the physical properties of the liquid are frequently altered because of the absorption of the gas into the liquid.

To overcome the shortcomings of centrifugal seals, limited leakage shaft seals have been used in their place. In this type of seal, a restricted fluid passage connects the sealing liquid with the fluid being processed. With this type of seal, the sealing liquid can be utilized to seal the processed fluid, lubricate the revolving elements of the machine and also may be employed as a cooling agent. As is usually the case, there are also certain shortcomings connected with the use of a limited leakage shaft seal. Not the least of these shortcomings is the inherent requirement of admitting the sealing liquid at a pressure greater than the maximum pressure of the fluid being processed. Because of this requirement, the sealing liquid combines with the processed fluid and in many cases must be separated before the processed fluid can be utilized for the purpose intended. Although this separation may be feasible, the reseparated sealing liquid remains contaminated and is usually not reusable and must be discarded. Since it is not unusual, in applications where a complete sealing of the processed fluid is required, for the sealing liquid leakage into the processed fluid to be on the order of several gallons per hour, it can readily be appreciated that considerable expense is involved.

From the above, it would seem desirable to provide a limited leakage shaft seal wherein the pressure differential across a flow restriction between the processed fluid and the sealing liquid would be maintained at a minimum. This has not necessarily been the solution at least not prior to applicants' invention.

Again referring to the situation where a gas is being processed, it is necessary to maintain a high pressure differential across the flow restriction between the sealing liquid and processed gas so that the gas does not become entrained or absorbed with the sealing liquid. Since the flow across the flow restriction, which is the leakage of the sealing liquid into the process gas, is a function of the pressure differential across the flow restriction, there is a consequent minimum leakage that had to be accepted prior to applicants' invention. Furthermore, since the pressure of the gas usually fluctuates and since the control mechanism used to maintain the perssure differential will not maintain one hundred percent accuracy, the safe pressure differential must even be higher than the theoretical pressure differential low limit with consequently more sealing liquid leakage. Therefore, prior to applicants' invention is was necessary to maintain this safe high pressure differential and accept the inherent sealing liquid leakage.

Applicants have invented a seal which maintains a substantial pressure balance across the flow restriction and thereby reduces leakage of the sealing liquid into the processed fluid from the previous average of several gallons per hour to less than several gallons per day. Furthermore, with applicants' seal there is no entrainment of the processed fluid into the sealing liquid system and absorption of the processed fluid by the sealing liquid has been materially reduced. Additionally, by employing novel features of construction, applicants have designed a seal wherein there is sufficient flow of sealing liquid to cool and lubricate the rotating machine safely.

It is a general object of the subject invention to provide a liquid seal which maintains the desirable characteristics of the two above described types of liquid seals and which overcomes the above mentioned shortcomings of these seals.

A further object of the subject invention is to provide a liquid seal which is effective during both static and dynamic conditions.

An additional object of the subject invention is to provide a liquid seal wherein the sealing liquid is substantially pressure balanced with the fluid being processed and which provides a liquid barrier to the flow of the processed fluid to atmosphere.

Another object of the subject invention is to provide a liquid seal wherein there is ample flow of sealing liquid to cool the seal, however, a seal wherein there is a minimum amount of leakage of the sealing liquid into the fluid being processed.

A further object of the subject invention is to provide a liquid seal having a floating bushing seal in series with a centrifugal type seal wherein there are positioned spoilers in the sealing liquid flow path upstream of the centrifugal seal to reduce the centrifugal force of the sealing liquid.

A further object of the subject invention is to provide a liquid seal of the hereinbefore described type wherein the bushing seal has a relatively small effective diameter as compared to the larger effective diameter of the centrifugal seal.

An additional object of the subject invention is to provide a liquid seal of the hereinbefore described type wherein surfaces of interleafed portions of the centrifugal seal are of a configuration to encourage pockets of swirling sealing liquid and thereby resist the escape to amosphere of the fluid being processed.

These and other objects of the subject invention will become more fully apparent as the following description is read in light of the attached drawing wherein is shown a cross sectional view of a seal constructed in accordance with the invention.

Referring to the drawing, a seal housing generally designated 11 has an opening therethrough in which is received a rotatable shaft 12. In application, the left hand end of the seal housing would be connected to a rotating machine containing pressurized fluid to be sealed. For example, the seal might be used in conjunction with a centrifugal compressor. The pressurized fluid would have a tendency to flow through the seal housing to the right or atmospheric side thereof. A floating bushing seal 13 composed of two annular halves 14 and 16 is provided at the atmospheric or low pressure side of the seal housing 11. The inside diameter of the floating bushing seal is slightly larger than the outside diameter of the shaft 12 and thereby defines an annular restricted fluid passage 17 between the bushing seal and the shaft. A series of coil springs 18 may be provided between the bushing halves to force them outward into sealing contact with their associated housing walls. Bushing half 16 is provided with an annular flange 19 having a groove in which is received a conventional O-ring 20 which is in sealing contact with an outside wall 21 of the seal housing. Bushing half 14 is also provided with an annular flange 22 which may be provided with a groove to receive a conventional O-ring seal 23 which is in contact with an inner wall 24 of the housing. Any conventional means may be provided to hold the bushing 13 against rotation and for this purpose pins 26 are received in radially disposed slots 27 and 28 in the bushing halves 14 and 16, respectively, and also in bores provided in the outer wall 21 and inner wall 24 of the housing. These pins permit radial floating movement of the floating bushing seal, however, hold the seal against rotational movement.

The inner wall 24 of the seal housing 11 has an inside diameter substantially larger than the outside diameter of the shaft 12 thereby defining a passage 25 in fluid communication with the restricted fluid passage 17. It should be noted that the passage 25 is larger than the passage 17 and thereby does not offer any substantial resistance to the flow of the sealing liquid. Axially spaced from the inner wall 24 is a sleeve 29 connected for rotation to the shaft 12. An internally threaded portion of the sleeve is received on an externally threaded portion of the shaft. This threaded connection locates and holds the sleeve axially relative to the shaft. An additional connection is provided to cause the sleeve to rotate with the shaft and this connection is herein shown as comprising a keyway slot 32 formed in the shaft and a key 33 connected to an annular rotating member 31 by means of a screw 34. The sleeve 29 may be sealed to the shaft 12 by means of a conventional O-ring 36 provided in an annular slot on the inside circumference of the sleeve. As herein shown for purposes of illustration, the radially extending annular member 31 is formed integral with the shaft. An annular radially extending passage 37 is defined by the axially spaced annular member 31 and the left hand side of the inner wall 24 and is in fluid communication with the fluid passage 25. A series of circumferentially spaced radially extending spoilers or antirotation members 38 are provided in the surface of the inner wall 24 which is exposed to the radial passage 37. It should be noted that these spoilers present a noncircular surface which, in this modification, is disposed at a right angle in relation to the direction of rotation of the sealing fluid.

In the drawing, an annular stationary member 39 is shown connected to the left hand end of the housing 11. This member 39 may be connected in any conventional manner and is herein shown as having an O-ring seal 41 provided between a hub portion 42 of the stationary member and the seal housing 11. The hub portion 42, as herein shown for purposes of illustration, extends parallel to the sleeve 29. The inside diameter of the hub portion 42 is larger than the outside diameter of sleeve 29 and thereby defines an annular outlet passage 43 in fluid communication with the high pressure area or fluid being processed. The radially outer end of the stationary member 39 may extend in an axial direction and is herein shown positioned adjacent to and on the outer side of the radially outer end 30 of the annular member 31 defining therewith an axially extending fluid passage 44 in fluid communication with the radial passage 37.

Attached to the rotational member 31 are a number of radially spaced axially extending annular rotational flanges 46. Attached to the annular member 39 are a number of radially spaced axially extending annular stationary flanges 47. The stationary flanges 47 are interleafed between the rotational flanges 46 and define therewith a clearance passage 48 which is in fluid communication with the passage 44 at one end and with the outlet passage 43 at the other end. Any number of stationary flanges 47 and rotational flanges 46 may be provided and the specific numbers shown in the drawing are for purposes of illustration only.

The rotational flanges 46 are provided with an inclined surface 49 sloping radially outward toward the annular member 31. The free ends of the stationary flanges 47 are provided with an inclined surface 51 sloping radially outward toward the annular member 39.

The sealing liquid is admitted through an inlet 52 and follows a circuitous path as indicated by the arrows to the opening or bushing inlet passage 53 of the floating bushing seal 13. The circuitous path for the sealing liquid assists in cooling the seal. It is advantageous, in order to provide adequate cooling, to supply more sealing liquid than is required to adequately seal the rotating machine and it is thereby necessary to provide a discharge passage 54 in parallel with the bushing inlet passage 53 which returns the excess sealing liquid back to the source of supply. Furthermore, in order to maintain the proper pressure of the sealing liquid, any conventional pressure regulating means 55 is provided in the discharge passage 54.

In operation, pressurized liquid from the source (not shown) is delivered to the inlet 52. From here the sealing liquid passes through the cooling passages as indicated by the arrows and into the inlet passage 53 of the floating bushing seal 13. Since the discharge passage 54 is parallel with the bushing inlet 53, a large flow of sealing liquid can be maintained to cool the seal without having any effect on the amount of flow into the restricted fluid passage 17. Before the shaft commences to rotate the floating bushing seal acts as a static seal to seal the processed fluid from escaping to the atmosphere. A portion of the sealing liquid passes to the right and to the atmosphere where it may be reused. An additional portion of the sealing liquid passes to the left and prohibits the processed fluid from escaping to the atmosphere. As the shaft commences to rotate the dynamic portion of the seal becomes operative and the rotating annular portion 31 tends to impart a centrifugal force to the sealing liquid in the radial passage 37 and in the clearance passage 48. Since these passages are on either side of the rotational member 31, the centrifugal force of the fluid in the passages would counterbalance one another. However, the spoilers 38 are provided to discourage rotation of the liquid in the radial passage 37 and thereby lower the centrifugal force of the sealing liquid in this passage. The centrifugal force of the liquid in the clearance passage 48 in effect creates a back pressure which reduces the pressure differential across the restricted fluid passage 17. As this pressure differential approaches zero the flow of sealing liquid also approaches zero and a substantial pressure balance results and little, if any, sealing liquid flows into the processed fluid.

As previously explained, prior to applicants' invention gas entrainment and absorption into the sealing liquid is quite likely to result if there is substantially no flow of sealing liquid. This is not, however, the case with the present seal. The sealing liquid passes through the axial passage 44 and into an annular pocket 56 defined by the axially extending flanges 46 and 47. As the liquid passes into this annular pocket 56 it flows down the sloping surface 51 and comes into contact with the inclined surface 49. The centrifugal force imparted to the sealing liquid by the rotation of the flanges 46 causes the liquid to flow upward along the inclined surface 49. The sealing liquid will tend to flow to the left along the inner surface 57 of the rotating portion 31 until it comes into contact with the sloping surface 51. The fluid will then flow down the sloping surface, contact the inclined surface and again due to centrifugal force move upward and be flung against the inner surface 57. In this manner a swirling annulus of sealing liquid is maintained in the annular pocket 56 and thereby provides a fluid barrier to the escape of the processed fluid. Due to the sloping surfaces of the flanges 46 and 47, the liquid in the pocket 56 is rotated at a very high angular velocity. If the pocket 56 is completely filled with sealing liquid, a solid annulus of swirling sealing liquid prevents entrainment of the gas. However, even if the pocket 56 is not completely filled with sealing liquid, no entrainment takes place. This is because the angular velocity of the sealing liquid causes a hollow swirling annulus of sealing liquid to result. In either case, the sealing liquid presents a solid wall of liquid and there are no voids or pockets in the liquid into which the gas can be entrained. Furthermore, by overcoming entrainment absorption is minimized so that only a very slight flow of sealing liquid is required.

Depending upon the pressure differential between the processed fluid and the sealing fluid and the number of annular pockets 56 provided, any number of swirling annuli of liquid will result. With this arrangement, the pressure differential between the sealing liquid and the processed fluid is not unduly critical as the number of swirling annuli will increase and decrease as the pressure differential increases and decreases.

Due to the novel construction of applicants, seal, leakage of a sealing liquid into a gas environment has been maintained at less than several gallons per day. Furthermore, due to the novel configuration of the pockets 56 and the swirling of the sealing liquid, entrainment of the processed fluid into the sealing liquid has been eliminated even with a small pressure differential across the bushing seal. It can thus be appreciated that applicants have invented a seal which includes all of the advantages of the centrifugal seal and limited leakage seal but which overcomes the shortcomings of these seals.

Although only one embodiment of the subject invention has been shown and described, it will be apparent to those skilled in the art that various modifications can be evolved without departing from the spirit of the invention or from the scope of the appended claims and all such modifications coming within a reasonable interpretation of the claims are intended to be covered.

Having now particularly described and ascertained the nature of our said invention and the manner in which it is to be performed, we declare that what we claim is:

1. In combination with a housing surrounding a rotatable shaft, means for sealing a high pressure area from a low pressure area comprising: walls defining a restricted fluid passage between said shaft and said housing and including an opening for receiving sealing fluid, one end of said restricted fluid passage being in fluid communication with said low pressure area and the other end thereof being in fluid communication with one end of a radial clearance passage, said radial clearance being defined by a number of axially disposed radially spaced annular rotational flanges connected for rotation with said shaft and a number of axially disposed radially spaced annular stationary flanges connected in fluid sealing relation to said housing and interleafed with said rotational flanges; means connected to said housing and positioned in said sealing fluid flow path upstream from said one end of said clearance passage and including at least one noncircular surface defining a plane disposed at an angle with the direction of rotation of said sealing fluid; and outlet passage means connecting the other end of said clearance passage with said high pressure area.

2. In combination with a housing surrounding a rotatable shaft, means for sealing a high pressure area from a low pressure area comprising: walls defining a restricted fluid passage between said housing and said shaft and including an opening for receiving sealing fluid, one end of said restricted fluid passage being in fluid communication with said low pressure area and the other end thereof being in fluid communication with one end of a radially disposed clearance passage, said radially disposed clearance passage being defined by a number of axially disposed radially spaced annular rotational flanges connected for rotation with said shaft and a number of axially disposed radially spaced annular stationary flanges connected in fluid sealing relation to said housing and interleafed with said rotational flanges; walls defining a sealing fluid inlet passage to said housing; walls defining a circuitous passage connecting said housing inlet to said restricted fluid passage opening and passing adjacent to said restricted fluid passage and said clearance passage to provide cooling thereof; a discharge passage connected to said restricted fluid passage opening; means positioned in said discharge passage for increasing the pressure of said sealing fluid; and outlet passage means connecting the other end of said clearance passage with said high pressure area.

3. In combination with a housing surrounding a rotatable shaft, means for sealing a high pressure area from a low pressure area comprising: walls defining a restricted fluid passage between said housing and said shaft and including an opening for receiving sealing fluid, one end of said restricted fluid passage being in fluid communication with said low pressure area and the other end thereof being in fluid communication with one end of a radial clearance passage, said radial clearance passage defined by a number of axially disposed radially spaced annular rotational flanges connected to said shaft for rotation therewith and a number of axially disposed radially spaced annular stationary flanges connected to said housing and interleafed with said rotational flanges, the radially outer surfaces of said rotational flanges declining toward said stationary flanges and the interleafed ends of said stationary flanges adjacent to said rotational flanges having a sloping surface declining toward said rotational flanges; means connected to said housing and positioned in said sealing fluid flow path upstream from said one end of said clearance passage and adjacent to said rotational flanges for resisting rotation of said sealing fluid; and outlet passage means connecting the other end of said clearance passage with said high pressure area.

4. In combination with a housing surrounding a rotatable shaft, means for sealing a high pressure area from a low pressure area comprising: an annular bushing connected in fluid sealing relation to said housing and positioned about said shaft and defining therewith a restricted fluid passage, one end of said restricted fluid passage being in fluid communication with said low pressure area; means holding said bushing against rotational movement; a bushing inlet passage for directing sealing fluid to said restricted fluid passage; a number of axially disposed radially spaced annular rotational flanges connected to said shaft for rotation therewith; a number of axially disposed radially spaced annular stationary flanges connected in fluid sealing relation to said housing and interleafed with said rotational flanges to form a radially disposed clearance passage, the radially outer surfaces of said rotational flanges declining toward said stationary flanges and the interleafed ends of said stationary flanges declining toward said declining surfaces of said rotating flanges; fluid passage means connecting the other end of said restricted fluid passage in fluid communication with the radially outer end of said clearance passage; walls defining a sealing fluid inlet passage to said housing, walls defining a circuitous passage connecting said housing inlet to said bushing inlet and passing adjacent to said restricted fluid passage, said passage means and said clearance passage to provide cooling thereof; a discharge passage connected to said bushing inlet; means positioned in said discharge passage for increasing the pressure of said sealing fluid; and outlet passage means connecting the radially inner end of said clearance passage with said high pressure area.

5. In combination with a housing surrounding a rotatable shaft, means for sealing a high pressure area from a low pressure area comprising: walls defining a restricted fluid passage between said shaft and said housing and including an opening for receiving sealing fluid, one end of said restricted fluid passage being in fluid communication with said low pressure area and the other end thereof being in fluid communication with one end of a radial clearance passage, said radial clearance being defined by a number of axially disposed radially spaced annular rotational flanges connected for rotation with said shaft and a number of axially disposed radially spaced annular stationary flanges connected in fluid sealing relation to said housing and interleafed with said rotational flanges; a plurality of circumferentially spaced radially directed antirotation members connected to said housing and positioned in said sealing fluid flow path upstream from said one end of said clearance passage and adjacent to said rotational flanges for resisting rotation of said sealing fluid; and outlet passage means connecting the other end of said clearance passage with said high pressure area.

References Cited in the file of this patent

UNITED STATES PATENTS 853,059     Bunge  ---------------- May 7, 1907

FOREIGN PATENTS 867,634     Germany  ------------ Feb. 19, 1953